US012625908B1

(12) United States Patent
Dong et al.

(10) Patent No.: US 12,625,908 B1
(45) Date of Patent: May 12, 2026

(54) CATEGORIZATION WITH GRAPH NEURAL NETWORK AND LANGUAGE MODEL

(71) Applicant: Intuit Inc., Mountain View, CA (US)

(72) Inventors: Kaiwen Dong, Granger, IN (US); Xiang Gao, Clyde Hill, WA (US); Maria Kissa, Mountain View, CA (US); Ayan Acharya, Hopkinton, MA (US); Hilaf Hasson, Mountain View, CA (US); Mauricio Flores, San Jose, CA (US); Heather Simpson, San Jose, CA (US); Byron Tang, Mountain View, CA (US); Kamalika Das, Saratoga, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/285,399

(22) Filed: Jul. 30, 2025

(30) Foreign Application Priority Data

Dec. 24, 2024 (EP) ..................................... 24386153

(51) Int. Cl.
*G06F 16/901* (2019.01)
*G06F 16/28* (2019.01)
*G06N 3/045* (2023.01)

(52) U.S. Cl.
CPC ........ *G06F 16/9024* (2019.01); *G06F 16/284* (2019.01); *G06N 3/045* (2023.01)

(58) Field of Classification Search
CPC .... G06F 16/9024; G06F 16/284; G06N 3/045
USPC ....................................................... 707/798
See application file for complete search history.

(56) References Cited

U.S. PATENT DOCUMENTS

| | | | | |
|---|---|---|---|---|
| 12,475,694 | B2 * | 11/2025 | Wu ................... | G06F 18/23213 |
| 2023/0126708 | A1 * | 4/2023 | Wadhwa ................ | G06N 20/20 |
| | | | | 705/44 |
| 2024/0118702 | A1 * | 4/2024 | Cella .................. | G06Q 10/0833 |
| 2024/0242068 | A1 * | 7/2024 | Rong ........................ | G06N 3/08 |
| 2024/0257160 | A1 * | 8/2024 | Singh ..................... | G06N 3/045 |

(Continued)

OTHER PUBLICATIONS

Zhao, Jianan, et al., "Heterogeneous Graph Structure Learning for Graph Neural Networks", Proc. of the AAAI Conf. on Artificial Intelligence (AAAI-21), vol. 35, No. 5, May 18, 2021, pp. 4697-4705.*

(Continued)

*Primary Examiner* — Robert Stevens
(74) *Attorney, Agent, or Firm* — Dinsmore & Shohl LLP

(57) ABSTRACT

Certain aspects of the disclosure provide techniques for categorization by a device. An example method includes receiving input information regarding a plurality of classification targets and a plurality of categories for classification of the plurality of classification targets; generating a plurality of embeddings for the input information using a first model, the plurality of embeddings including: a set of first embeddings associated with the plurality of classification targets, and a set of second embeddings associated with the plurality of categories; determining that a similarity score for the set of first embeddings and the set of second embeddings fails to satisfy a threshold; generating, based on the similarity score failing to satisfy the threshold and using a graph neural network (GNN), a classification of the plurality of classification targets in accordance with the plurality of categories; and outputting information regarding the classification.

20 Claims, 9 Drawing Sheets

(56)                    References Cited

U.S. PATENT DOCUMENTS

2025/0190777 A1 *   6/2025   Csurka Khedari  ..... G06F 16/55
2025/0225370 A1 *   7/2025   Choubey ................ G06N 3/045
2025/0248643 A1 *   8/2025   Kim ..................... A61B 5/7267
2025/0335772 A1 *  10/2025   Bono ..................... G06N 3/084

OTHER PUBLICATIONS

Liu, Junhong, et al., "When Heterophily Meets Heterogeneity: New Graph Benchmarks and Effective Methods", arXiv, Cornell University, document: arXiv:2407.10916v1, Jul. 15, 2024, pp. 1-23.*
Singh, Moirangthem Tiken, et al., "Heterogeneous Graph Auto-Encoder for Credit Card Fraud Detection", arXiv, Cornell University, document: arXiv:2410.08121v1, Oct. 10, 2024, pp. 1-27.*
Bing, Rui, et al., "Heterogeneous graph neural networks analysis: a survey of techniques, evaluations and applications", Artificial Intelligence Review, vol. 56, Springer Nature Link, Dec. 21, 2022, pp. 8003-8042.*
Luo, Linhao, et al., "GSim: A Graph Neural Network Based Relevance Measure for Heterogeneous Graphs", IEEE Transactions on Knowledge and Data Engineering, vol. 35, No. 12, Dec. 2023, pp. 12693-12707.*

* cited by examiner

300
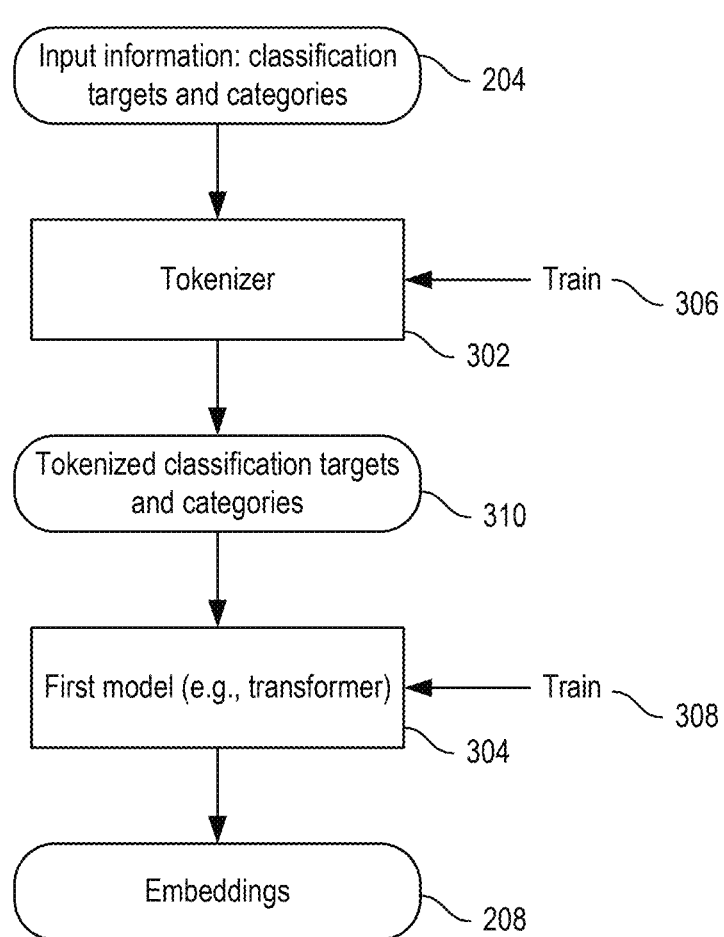
Input information: classification
targets and categories — 204
Tokenizer — 302 ← Train — 306
Tokenized classification targets
and categories — 310
First model (e.g., transformer) — 304 ← Train — 308
Embeddings — 208
*FIG. 3*

400

406

Company
Company ID
Company Name
Industry Name
Business Type

414

404

Transaction
Transaction ID
Company ID
Description
Amount
Memo
Categorization

412

402

Category
Category ID
Category Name
Level 2 ID

408

Level 2
Level 2 ID
Level 2 Name
Level 1 ID

410

Level 1
Level 1 ID
Level 1 Name

416

418

Figure 6:
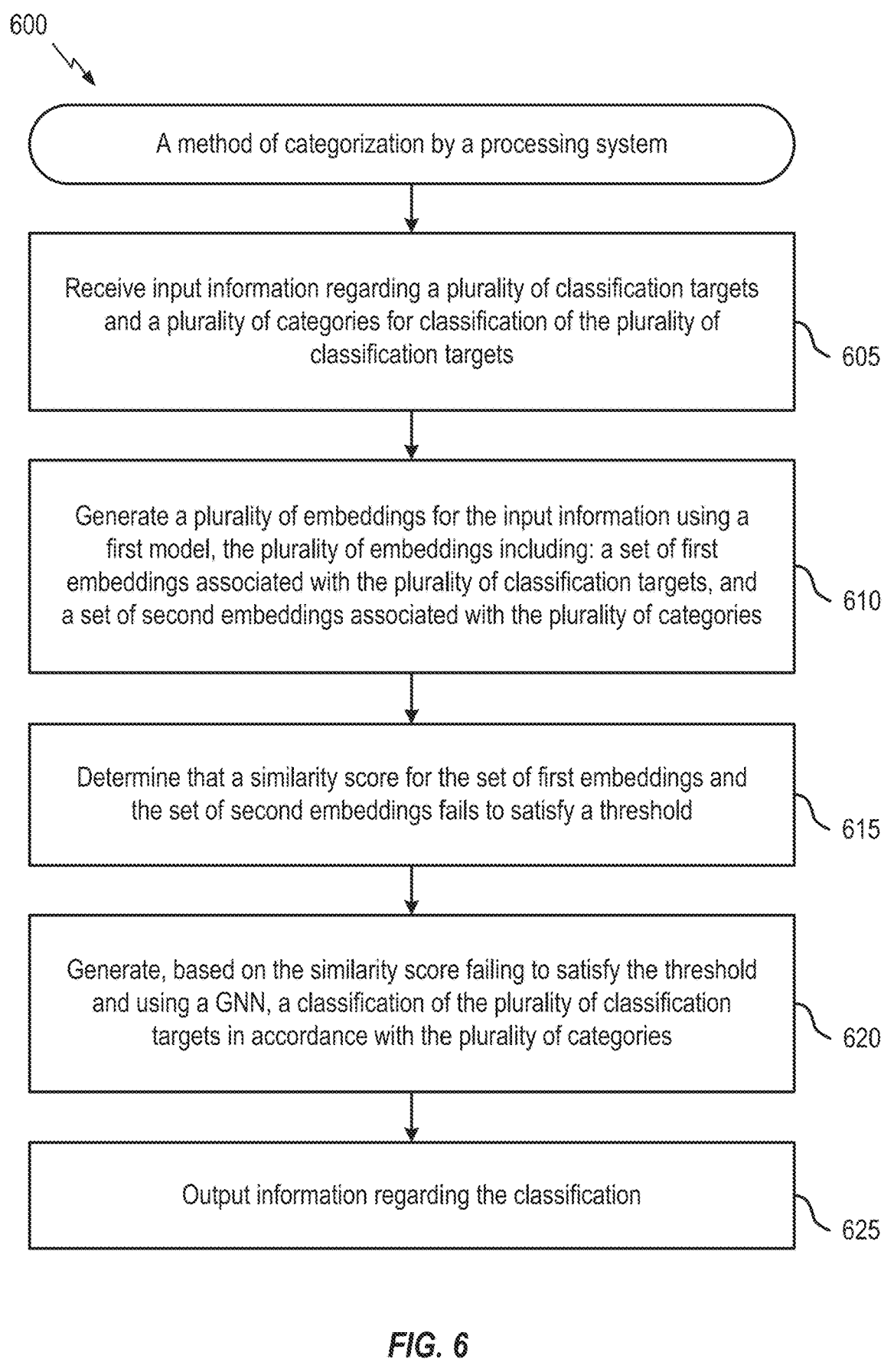

600

A method of categorization by a processing system

Receive input information regarding a plurality of classification targets and a plurality of categories for classification of the plurality of classification targets

605

Generate a plurality of embeddings for the input information using a first model, the plurality of embeddings including: a set of first embeddings associated with the plurality of classification targets, and a set of second embeddings associated with the plurality of categories

610

Determine that a similarity score for the set of first embeddings and the set of second embeddings fails to satisfy a threshold

615

Generate, based on the similarity score failing to satisfy the threshold and using a GNN, a classification of the plurality of classification targets in accordance with the plurality of categories

620

Output information regarding the classification

Figure 7:
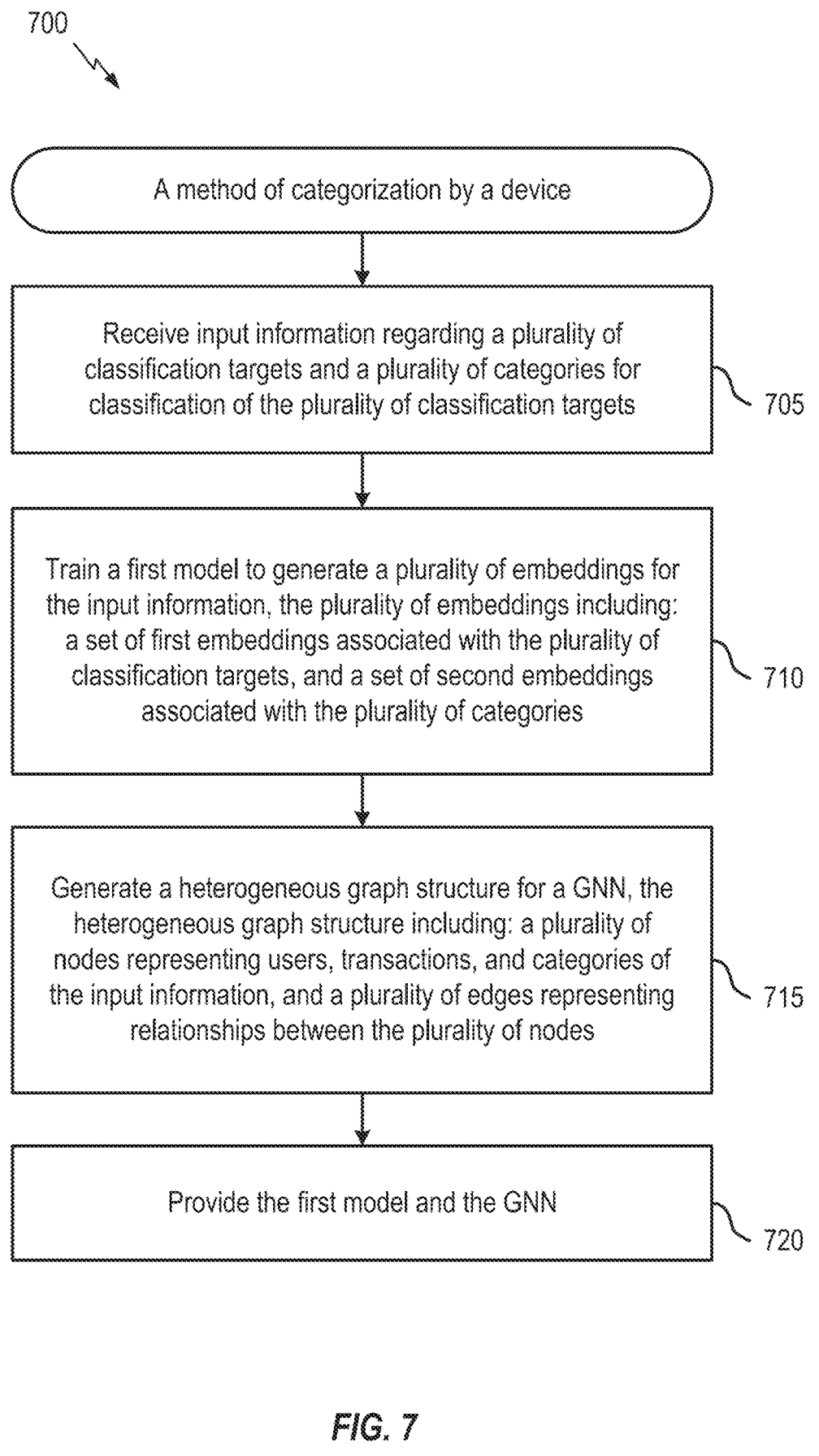

```
┌─────────────────────────────────────────────────┐
│        A method of categorization by a device    │
└─────────────────────────────────────────────────┘
                        │
                        ▼
┌─────────────────────────────────────────────────┐
│  Receive input information regarding a plurality of │      705
│  classification targets and a plurality of categories for │
│  classification of the plurality of classification targets │
└─────────────────────────────────────────────────┘
                        │
                        ▼
┌─────────────────────────────────────────────────┐
│  Train a first model to generate a plurality of embeddings for │
│  the input information, the plurality of embeddings including: │      710
│  a set of first embeddings associated with the plurality of │
│  classification targets, and a set of second embeddings │
│  associated with the plurality of categories │
└─────────────────────────────────────────────────┘
                        │
                        ▼
┌─────────────────────────────────────────────────┐
│  Generate a heterogeneous graph structure for a GNN, the │
│  heterogeneous graph structure including: a plurality of │
│  nodes representing users, transactions, and categories of │      715
│  the input information, and a plurality of edges representing │
│  relationships between the plurality of nodes │
└─────────────────────────────────────────────────┘
                        │
                        ▼
┌─────────────────────────────────────────────────┐
│         Provide the first model and the GNN      │      720
└─────────────────────────────────────────────────┘
```

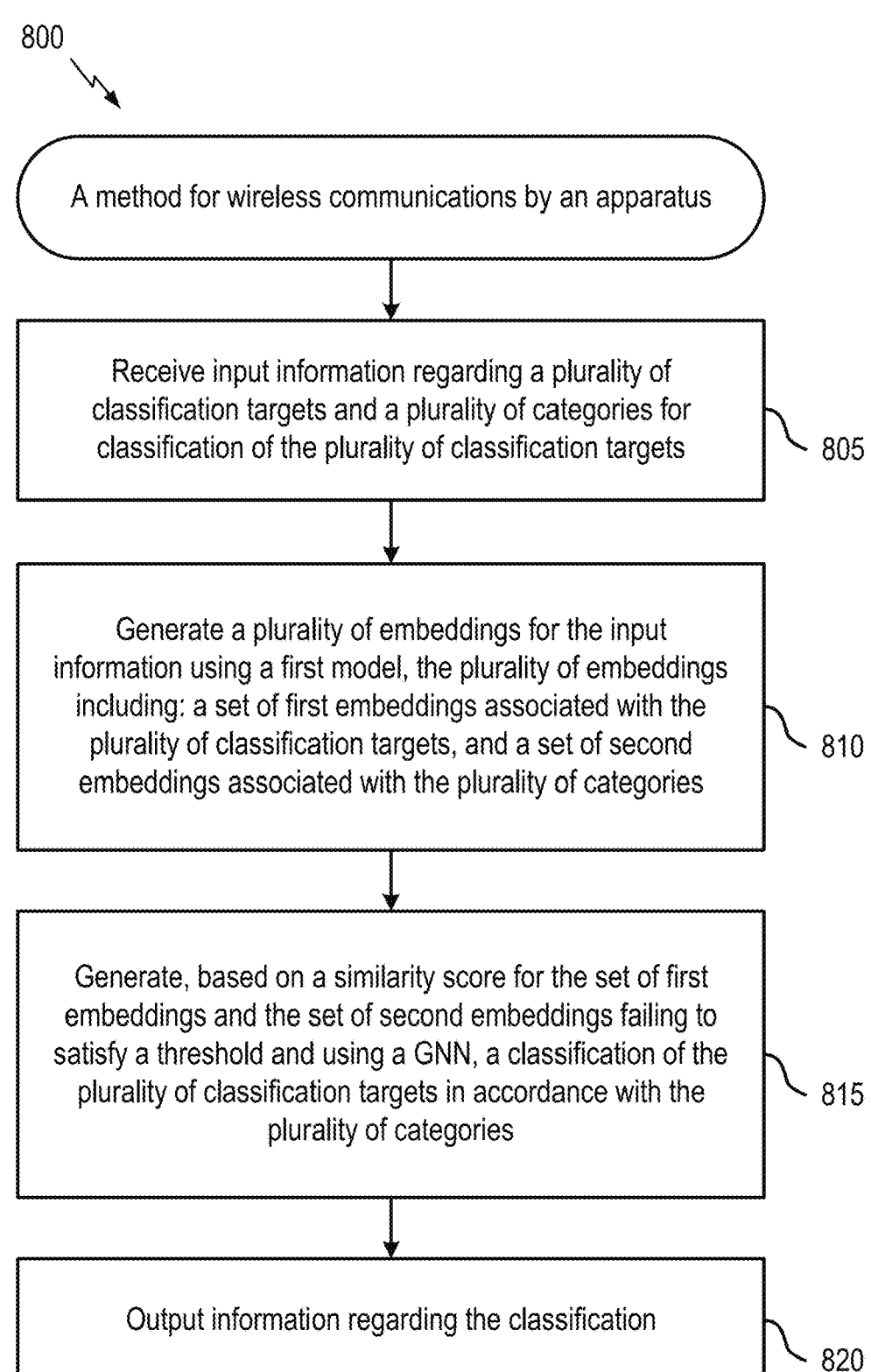

A method for wireless communications by an apparatus

Receive input information regarding a plurality of classification targets and a plurality of categories for classification of the plurality of classification targets — 805

Generate a plurality of embeddings for the input information using a first model, the plurality of embeddings including: a set of first embeddings associated with the plurality of classification targets, and a set of second embeddings associated with the plurality of categories — 810

Generate, based on a similarity score for the set of first embeddings and the set of second embeddings failing to satisfy a threshold and using a GNN, a classification of the plurality of classification targets in accordance with the plurality of categories — 815

Output information regarding the classification — 820

*FIG. 8*

CATEGORIZATION WITH GRAPH NEURAL NETWORK AND LANGUAGE MODEL

CROSS-REFERENCE TO RELATED APPLICATION(S)

This application claims benefit of and priority to European Patent Application No. 24386153.1, filed Dec. 24, 2024, which is herein incorporated by reference in its entirety for all applicable purposes.

BACKGROUND

Field

Aspects of the present disclosure relate to intelligent systems and machine learning platforms, particularly to methods and systems for categorizing classification targets with a graph neural network and a language model.

Description of Related Art

It is beneficial in various arts to classify a set of objects (such as descriptions of transactions, text strings, or other objects), such as by assigning each object of the set of objects to a category. There are various methods for classification, ranging from simple text matching to complex machine learning based approaches. Different methods have tradeoffs with regard to computational complexity, accuracy, and versatility.

SUMMARY

Certain aspects provide a method of categorization by a processing system. The method includes receiving input information regarding a plurality of classification targets and a plurality of categories for classification of the plurality of classification targets; generating a plurality of embeddings for the input information using a first model, the plurality of embeddings including: a set of first embeddings associated with the plurality of classification targets, and a set of second embeddings associated with the plurality of categories; determining that a similarity score for the set of first embeddings and the set of second embeddings fails to satisfy a threshold; generating, based on the similarity score failing to satisfy the threshold and using a graph neural network (GNN), a classification of the plurality of classification targets in accordance with the plurality of categories; and outputting information regarding the classification.

Certain aspects provide a method of categorization by a processing system. The method includes receiving input information regarding a plurality of classification targets and a plurality of categories for classification of the plurality of classification targets; training a first model to generate a plurality of embeddings for the input information, the plurality of embeddings including: a set of first embeddings associated with the plurality of classification targets, and a set of second embeddings associated with the plurality of categories; generating a heterogeneous graph structure for a GNN, the heterogeneous graph structure including: a plurality of nodes representing users, transactions, and categories of the input information, and a plurality of edges representing relationships between the plurality of nodes; and providing the first model and the GNN.

Certain aspects provide a method by a processing system. The method includes receiving input information regarding a plurality of classification targets and a plurality of categories for classification of the plurality of classification targets; generating a plurality of embeddings for the input information using a first model, the plurality of embeddings including: a set of first embeddings associated with the plurality of classification targets, and a set of second embeddings associated with the plurality of categories; generating, based on a similarity score for the set of first embeddings and the set of second embeddings failing to satisfy a threshold and using a GNN, a classification of the plurality of classification targets in accordance with the plurality of categories; and outputting information regarding the classification.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 3 is a diagram illustrating an example of training and implementing a tokenizer and a transformer for embedding of input information comprising classification targets.

FIG. 6 depicts a method for categorization by a device.

FIG. 7 depicts another method for categorization by a device.

FIG. 8 depicts another method for categorization by a device.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
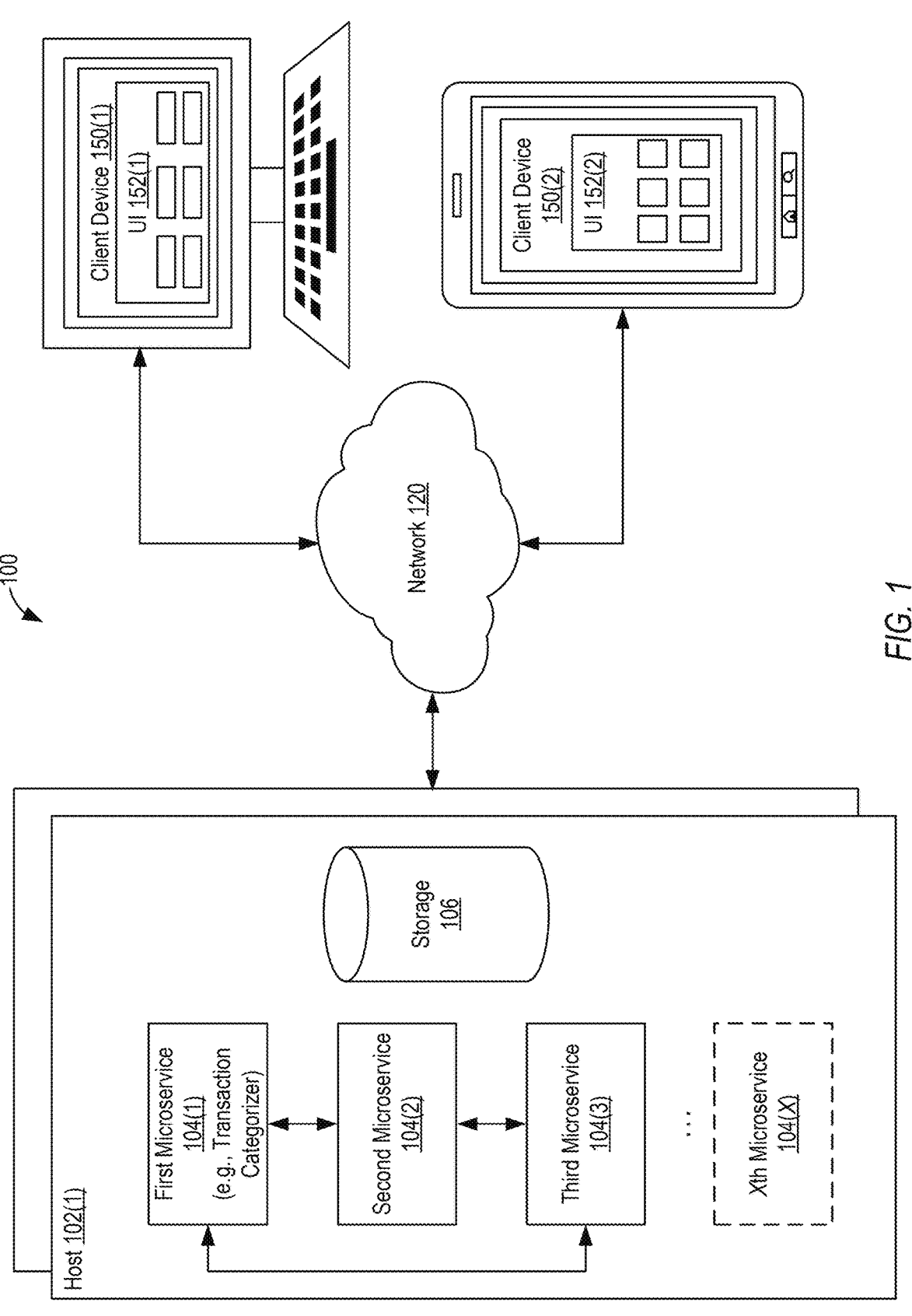
FIG. 1 depicts an example system supporting microservices.

Aspects of the present disclosure provide apparatuses, methods, processing systems, and computer-readable mediums for categorizing classification targets with a graph neural network and a language model.

Classification of data is an important task in various fields. Classification involves categorizing data points into predefined classes (referred to herein as "categories") based on their attributes. Traditional approaches to classification often rely on rule-based systems, where a set of predefined rules is used to determine the category of a given data point. These systems are straightforward to implement and can be effective when the rules are well-defined and the data is relatively simple. However, rule-based systems can become cumbersome and less effective as the complexity and volume of data increase. They are also inflexible, as any change in the classification criteria or target categories involves manual updates to the rules, which can be time-consuming and error-prone. Another form of classification is based on semantic similarity, where vectors representing a classification target and a potential category are evaluated for similarity to one another. This approach is computationally efficient, but may be limited in performance and may be limited by the quality of vectors (e.g., embeddings) that are generated to support semantic similarity determination. For example, if embeddings are generated using a model that is ill-fitted to the input information on which the model is run, then outputs may fail to capture actual semantic similarity. As an example, a traditional model (e.g., a traditional transformer) may fail to capture that "Alaska®" and "Spirit®" are conceptually related as airlines, so transactions involving these companies may not be detected as semantically similar to one another.

Machine learning-based approaches have gained popularity as they offer more flexibility and can handle larger and more complex datasets. Techniques such as decision trees, support vector machines (SVM), and neural networks are commonly used for classification tasks. Decision trees are easy to interpret and can handle both numerical and categorical data, but they can be prone to overfitting, especially with noisy data. SVMs are effective in high-dimensional spaces and can provide robust classification boundaries, but they can be computationally intensive and less interpretable. Neural networks, particularly deep learning models, have shown remarkable performance in various classification tasks due to their ability to learn complex patterns from data. However, they require large amounts of labeled data for training and can be computationally expensive.

Furthermore, traditional forms of classification algorithms may struggle with classification of data that is structured in a format that is non-ideal for classification. For example, real-world data may often be structured in a relational database. A relational database is a type of database that organizes data into tables, which include rows and columns, with each table representing a specific entity and each row representing a unique instance of that entity. Relationships between tables are established through the use of primary keys and foreign keys, allowing for efficient data retrieval and manipulation. Relational databases are widely used for their flexibility, scalability, and ability to maintain data integrity through constraints and normalization. In particular, relational databases can be used to store transactional data and to associate the transactional data with businesses, categorizations (e.g., transaction type, tax-related categorizations, etc.), and so on. The relational nature of a relational database may provide information that is beneficial for classification. However, classical machine learning-based approaches may fail to leverage this relational nature.

Still further, the classical machine learning approaches described above may provide limited or suboptimal performance in cases where categorizations differ from implementation to implementation or from user to user. Traditional classification methods struggle with this variability because traditional classification methods typically use a fixed set of categories. In this situation, significant computational resources may be used to train classifiers for each user or implementation's individual configuration of categories, or suboptimal classification performance may be experienced.

Aspects of the present disclosure solve the above and other technical problems by providing a system that classifies input information (referred to as "classification targets") into categories or potential categories based on (1) a semantic similarity determination, or (2) if no threshold semantic similarity is determined, a graph neural network (GNN) based approach.

The semantic similarity determination may use embeddings of classification targets and categories. These embeddings may be determined using a tokenizer and/or a model (such as a transformer). The tokenizer and/or the transformer may be trained on historical input information (such as past classification targets, categories, or the like). Thus, the embeddings may be suitable for a domain associated with the classification targets, such as transaction information. This improves accuracy of the semantic similarity determination and the GNN based approach, which conserves processor resources by improving the likelihood that a category can be assigned at the semantic similarity determination rather than at a more computationally expensive GNN stage.

Notably, the GNN uses a heterogeneous graph structure that is derived from a relational database according to aspects described herein. The heterogeneous graph structure is derived from the relational database by mapping the tables, rows, and relationships within the database to corresponding components in the graph. Each table in the relational database is represented as a distinct node type in the graph, and each row within a table becomes a node of that node type. The relationships between rows across different tables, defined by foreign-primary key pairs, are represented as edges connecting the corresponding nodes in the graph. Additionally, the attributes of each row, such as textual data, are used as node attributes in the graph. This transformation allows the relational database to be modeled as a graph, enabling the application of a GNN to perform tasks such as link prediction (and therefore classification). Deriving the heterogeneous graph structure from the relational database preserves relationships between classification targets, information associated with the classification targets (e.g., companies, past transactions, recipients or originators of transactions, other categorizations associated with the classification targets), and categories, thereby improving the accuracy of the GNN based approach for a given expenditure of computational resources.

In the GNN based approach, the classification of classification targets into categories is treated as a link prediction task within the heterogeneous graph structure, where nodes represent transactions and categories, and edges represent the relationships between them. This allows for categories to be defined at the individual, implementation, or user granularity, as compared to other approaches which may require predefined categories. Thus, a flexible and scalable solution is provided by treating the classification problem as a link prediction task within a graph. This enables the system to handle a varying number of categories (or different categories) across different users without the need for a fixed set of classes. Secondly, the GNN can leverage the relational structure of the data, capturing the hierarchical nature of categories and the similarities between users, which enhances the accuracy and efficiency of the classification process. Additionally, the GNN approach is computationally cheaper and faster compared to other approaches such as classification using large language models, making it a more practical solution for real-world applications. Furthermore, the GNN can be used to suggest a category name where such name has not previously been defined, thereby improving user experience and reducing the occurrence of uncategorized or mis-categorized classification targets.

Example System Implementing Mixed-Integer Programming and Linear Programming for Communication Generation FIG. 1 depicts an example system 100 supporting microservices 104 (e.g., software-defined service, which in some cases, may be cloud-native). As shown in FIG. 1, system 100 comprises client devices 150(1)-(2) (collectively referred to herein as "client devices 150") and host(s) 102 interconnected through a network 120. Network 120 may be, for example, a direct link, a local area network (LAN), a wide area network (WAN), such as the Internet, another type of network, or a combination of one or more of these networks.

Host(s) 102 may be geographically co-located servers on the same rack or on different racks in any arbitrary location in a data center. Host(s) 102 may be constructed on a server grade hardware platform and include components of a computing device such as, one or more processors (central processing units (CPUs)), one or more memories (random access memory (RAM)), one or more network interfaces (e.g., physical network interfaces (PNICs)), storage 106, and other components (e.g., only storage 106 is shown in FIG. 1).

A first host 102(1) in system 100 may host a plurality of microservices 104(1)-(X) (collectively referred to herein as "microservices 104"), where X is an integer greater than one. The microservices 104 may be deployed using virtual machines (VMs) and/or container(s) running on first host 102(1) (e.g., where first host 102(1) is running a hypervisor (not shown) used to abstract processor, memory, storage, and networking resources of first host 102(1)'s hardware platform). Generally, microservices 104 are loosely coupled and independently deployable services (or software) that may make up an application. Microservices 104 may enable segmented, granular level functionalities within a larger system infrastructure.

Client device 150(1) and client device 150(2) may each include a user interface (UI) 152(1), 152(2), respectively, which may be used to communicate with, at least, a first microservice 104(1), a second microservice 104(2), and/or through an X-th microservice 104(X) using the network 120. For example, communication between client devices 150 and a microservice 104 may be facilitated by one or more application programming interfaces (APIs). Examples of client devices 150 may include a smartphone, a personal computer, a tablet, a laptop computer, and/or other devices.

As shown in FIG. 1, in certain embodiments, the first microservice 104(1) implements an information service, which is any network 120 accessible service that maintains financial data, medical data, personal identification data, and/or other data types. For example, the information service may include MailChimp® and its variants made commercially available by Intuit® of Mountain View, California. In certain embodiments, the first microservice 104(1) implements a classification system, such as a classification system described with regard to FIGS. 2-5. For example, the classification system may provide for categorization of classification targets using a semantic similarity, a GNN, or a combination thereof.

Storage 106 may include any form of storage. In some aspects, storage 106 stores input information, such as a set of classification targets (e.g., transaction information), categorizations, data associated with a set of classification targets, or the like. In some aspects, storage 106 includes a relational database that includes the input information. In some aspects, storage 106 stores embeddings derived from the input information. In some aspects, storage 106

Though FIG. 1 depicts each of first host 102(1), storage 106, client device 150(1), and client device 150(2) as single devices for ease of illustration, first host 102(1), storage 106, client device 150(1), and/or client device 150(2) may be embodied in different forms for different implementations. Further, though FIG. 1 depicts only two hosts 102 and two client devices 150, other embodiments may include more or less hosts 102 and/or client devices 150, and client devices 150 may use any combination of microservices 104 on any host 102 where microservices 104 are deployed.

Figure 2:
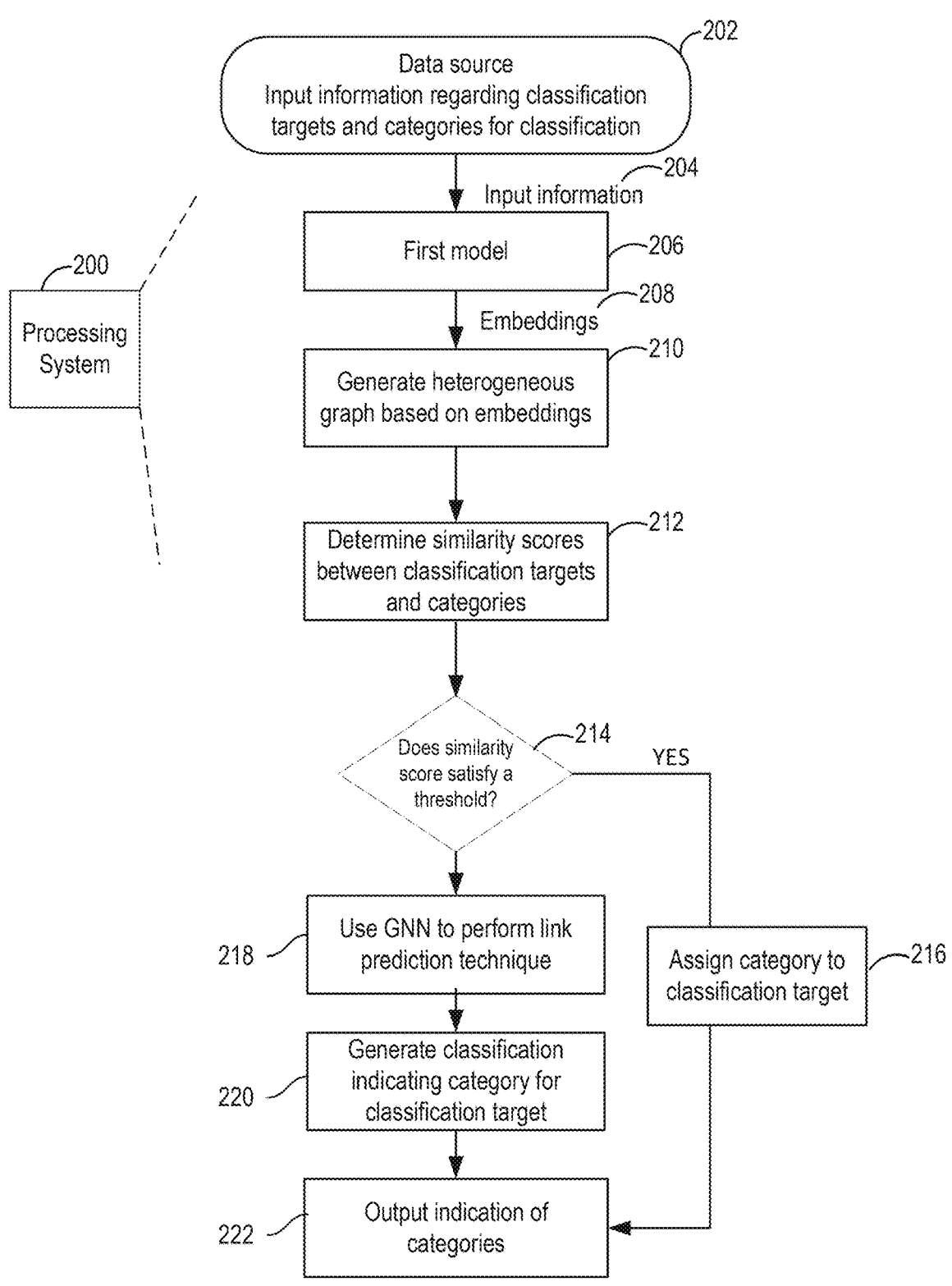
FIG. 2 is a diagram illustrating an example of categorization of classification targets using a graph neural network and a language model.

FIG. 2 is a diagram illustrating an example of categorization of classification targets using semantic similarity and a GNN. The operations of FIG. 2 may be performed by a processing system 200. Processing system 200 may include a host 102, a microservice 104, an apparatus described with regard to FIG. 7, or the like.

As shown, the processing system 200 may obtain input information 204 from a data source 202. The data source 202 may include or be stored at storage 106. The input information 204 may include information regarding a set of classification targets, and categories for classification of the set of classification targets. In some aspects, the categories may be user-defined, such as by a user of processing system 200. In some aspects, the input information 204 may include historical information, such as information regarding classification targets that have already been categorized. In some aspects, the input information 204 may include one or more relational databases. In some aspects, the input information 204 may include transaction information, such as information regarding a set of transactions associated with (e.g., performed by) a user.

The input information 204 comprises information related to a plurality of classification targets (e.g., transactions) to be categorized. This information includes textual descriptions of the transactions, which may be provided by financial institutions and may contain abbreviated or concatenated terms. Additionally, the input information 204 may include metadata such as a transaction amount (indicating a monetary value of the transaction), and a transaction type (specifying whether the transaction is an inflow or an outflow). Additional description of input information 204 is provided with regard to FIGS. 4 and 5.

As shown, the processing system 200 may generate embeddings 208 using a first model 206. The embeddings 208 include first embeddings associated with (e.g., derived from) classification targets and second embeddings associated with (e.g., derived from) categories. In this example, the first model 206 is a transformer-based language model trained to handle characteristics of transaction data. The first model 206 includes or utilizes a tokenizer that has been trained on input information (e.g., transaction data) to effectively handle the abbreviated and concatenated terms commonly found in input information 204. This tokenizer provides for the input text to be used to generate (e.g., broken down into) tokens that the first model 206 can understand and process efficiently. Additional description of training of the tokenizer and first model 206 is provided in connection with FIG. 3.

Once the input information 204 is tokenized, the first model 206 converts these tokens into vector representations, known as embeddings 208. These embeddings 208 capture or represent semantic meaning of the input information 204, allowing the first model 206 to understand the context and relationships between different elements of the input information 204. The transformer architecture of the first model 206 enables the first model 206 to capture long-range dependencies and complex patterns within the data, resulting in informative embeddings 208. For instance, the first model 206 can recognize that a transaction description containing "Alaska" is likely related to airline travel, since the embeddings 208 are generated by a tokenizer trained on historical transaction information.

Figure 5:
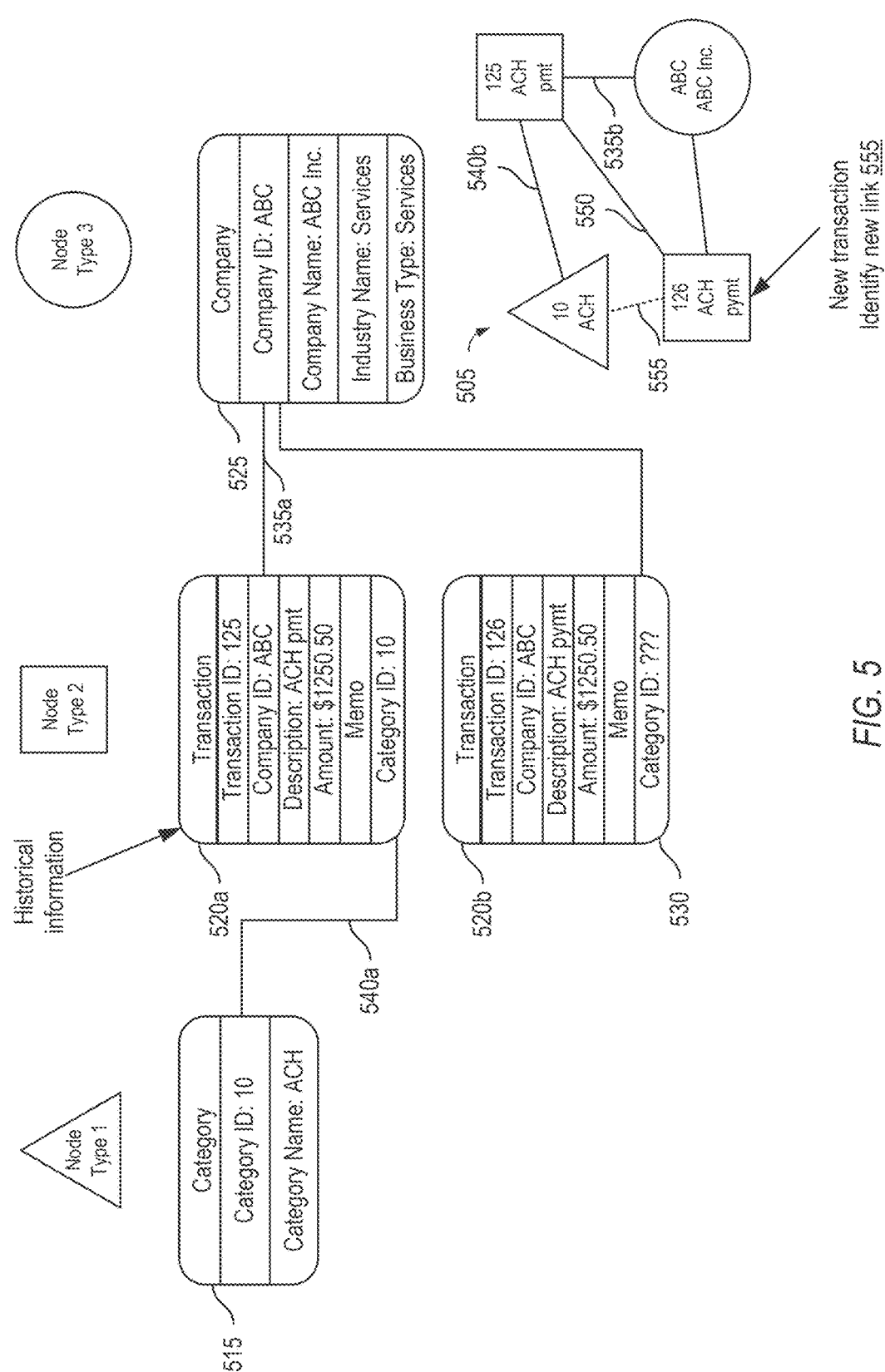
FIG. 5 illustrates an example of generation of a heterogeneous graph based on a relational database of input information and historical information.

At 210, the processing system 200 generates a heterogeneous graph structure based on the input information 204 and/or the embeddings 208. To generate the heterogeneous graph structure, the processing system 200 may transform a relational database (e.g., included in the input information 204), which contains various interconnected tables, into a graph representation. Each table in the relational database, such as tables representing users, transactions, and categories, is mapped to a distinct node type in the graph, as illustrated in FIG. 5. Individual rows within these tables are converted to nodes of the corresponding node type, and the relationships between rows (which may be defined by foreign-primary key pairs) are represented as edges connecting the nodes. Thus, the heterogeneous graph is based on relationships of the relational database. This process captures the relationships and hierarchical structures inherent in the data, such as the links between users and their transactions, and transactions and their categories. Additionally, attributes of each row, such as textual descriptions and transaction amounts, are incorporated as node attributes in the graph.

The relational database may be defined as $(\mathcal{T}, \mathcal{L})$, including a set of tables $\mathcal{T} = \{T_i\}$ where i represents different tables such as "classification target", "company", "level1", "level2", or "categorization". "level1" and "level2" may provide additional forms of classification or categorization in addition to the table labeled "categorization," such as different hierarchical classifications. The relationships between these tables are captured by links $\mathcal{L} \subseteq \mathcal{T} \times \mathcal{T}$. An edge $L = (T_{fkey}, T_{pkey})$ exists if a foreign key column in $T_{fkey}$ points to a primary key column in $T_{pkey}$.

Each table T comprises a set of rows $T = \{v_1, \ldots, v_{n_T}\}$, where each row $v \in T$ includes three components: (1) Primary key $p_v$ uniquely identifies the row v within its table; (2) Foreign keys $\mathcal{K}_v \subseteq \{p_{v'}: v' \in T' \text{ and } (T, T') \in \mathcal{L}\}$ establish connections to rows v' in other tables T'; and (3) Attributes $x_v$ hold the informational content of the row, such as textual data, which are encoded to generate embeddings 208.

The relational database also uses a relation type $\mathcal{R} = \mathcal{L} \cup \mathcal{L}^{-1}$, where $\mathcal{L}^{-1} = \{(T_{pkey}, T_{fkey}) | (T_{fkey}, T_{pkey}) \in \mathcal{L}\}$, representing the inverse of the primary-foreign key links.

The heterogeneous graph may be generated (e.g., formalized) as $G = (\mathcal{V}, \mathcal{E}, \phi, \psi)$, text use where $\mathcal{V}$ is a node set, representing rows across all tables, $\mathcal{E} \subseteq \mathcal{V} \times \mathcal{V}$ is an edge set, representing relationships based on primary-foreign key mappings, $\phi: \mathcal{V} \rightarrow \mathcal{T}$ is a node type mapping function, assigning each node to its corresponding node type (table), and $\psi: \mathcal{E} \rightarrow \mathcal{R}$ is an edge type mapping function, linking each edge to its relation type. The processing system 200 then maps the elements of the relational database $(\mathcal{T}, \mathcal{L})$ to the elements of the heterogeneous graph $G = (\mathcal{V}, \mathcal{E}, \phi, \psi)$. First, the node set in the converted graph is defined as the union of all rows in all tables $\mathcal{V} = U_{T \in \mathcal{T}} T$. Then, an edge set is defined according to Equation 1 as:

$$\mathcal{E} = \{(v_1, v_2) \in \mathcal{V} \times \mathcal{V} \,|\, p_{v_2} \in \mathcal{K}_{v_1} \text{ or } p_{v_1} \in \mathcal{K}_{v_2}\}$$

That is, the edge set is the row pairs that arise from the primary-foreign key relationships in the database. Therefore, the type mapping function can be defined as $\phi(v) = T$ for all $v \in T$ and $\psi(v_1, v_2) = (\phi(v_1), \phi(v_2)) \in \mathcal{R}$ if $(v_1, v_2) \in \mathcal{E}$. The attributes $x_v$ hold the node attributes for each node v.

At 212, the processing system 200 determines similarity scores between the classification targets (e.g., embeddings 208 of the classification targets) and the categories (e.g., embeddings 208 of the categories). To determine the similarity score between a classification target and a category, the processing system 200 may calculate a metric such as a cosine similarity. A cosine similarity metric measures the cosine of the angle between two vectors (in this case, embeddings 208) in a multi-dimensional space, providing a value that indicates how closely related the two embeddings 208 are. A higher cosine similarity score suggests that the classification target and the category are more semantically aligned, implying that the classification target likely belongs to that category.

At 214, the processing system 200 determines if a similarity score between a classification target and a category satisfies a threshold. For example, the processing system 200 may perform this determination for each similarity score determined at 212. If the similarity score for a given classification target satisfies the threshold (block 214—YES), then the processing system may proceed to assign the category to the classification target at 216. If the similarity score for a given classification target fails to satisfy the threshold (block 214—NO), the embeddings 208 are passed to a GNN for further analysis and classification, leveraging the relational structure of the data to improve accuracy. This two-stage approach conserves processing resources that would otherwise be used to perform GNN processing for each classification target.

The determination at 214 may be considered a top K nearest neighbor early exit method. For example, when a new classification target is introduced, the processing system 200 first computes the similarity scores between the new classification target's embedding 208 and the embeddings 208 of historical classification targets associated with the same user. If the similarity score exceeds a predefined threshold, the system identifies the top K most similar historical classification targets. The categories of these top K classification targets are then directly used to predict the category of the new classification target, bypassing the need for further processing by the GNN.

This approach reduces computational overhead and latency, as it leverages the existing knowledge of similar transactions to make quick and accurate predictions. The Top K nearest neighbor technique is particularly effective for routine activities where transactions often recur with similar descriptions and amounts. By directly using the categories of the most similar historical transactions, the system can provide immediate and reliable categorization for a substantial portion of new transactions. However, if fewer than five distinct categories are identified from the top K similar transactions, the system proceeds to use the GNN to generate the remaining predictions. This ensures that the system maintains high accuracy and robustness, even for transactions that do not have clear historical analogs.

In some aspects, the processing system 200 updates the heterogeneous graph based on the determination at 212. For example, if the similarity score for a given classification target satisfies the threshold, the processing system 200 may update the heterogeneous graph so that a node corresponding to the classification target is linked to a node corresponding to the category. Additionally, or alternatively, the processing system 200 may update the corresponding relational database accordingly.

At 218, the processing system 200 uses a GNN to perform a link prediction technique. The GNN iteratively updates the representations of nodes (transactions and categories) of the heterogeneous graph through a process known as message passing. During each iteration, a node aggregates information from its neighboring nodes, which allows it to capture the relational context and dependencies within the graph. For instance, a transaction node may gather information from related user nodes and category nodes, refining its representation based on these connections.

For example, the GNN may aggregate features from neighboring nodes according to Equation 2:

$$h_v^{(i+1)} = t\left(h_v^{(i)}, AGG\left(\left\{g\left(h_w^{(i)}\right)|w \in \mathcal{N}(v)\right\}\right)\right)$$

Here, t($\cdot$) and g($\cdot$) are neural networks, $\mathcal{N}$ (v) represents the set of neighbors of node v, and AGG($\cdot$) is an aggregation function such as mean, max, sum, or attention.

The link prediction technique then involves determining the likelihood of an edge (or link) existing between a transaction node and a category node. The GNN computes a similarity score for each potential transaction-category pair by evaluating the learned embeddings of the nodes. This score indicates the strength of the relationship between the transaction and the category, effectively predicting whether the transaction should be classified under that category. At 220, a classification is generated, according to the most likely edge, indicating a category for a classification target. The GNN's ability to consider multiple types of relationships and aggregate information from various nodes makes it particularly well-suited for this task, as it can account for the complex and hierarchical nature of the data.

In some aspects, message-passing along different edge types is modeled separately. For example, each message type may initial be processed by an individual GNN according to Equation 2. The messages from various edge type may then be combined according to an aggregation function, which produces a comprehensive node representation according to Equation 3:

$$h_v^{(i+1)} = t_{\phi(v)}\left(h_v^{(i)}, AGG_{Heter}\left(\left\{AGG_{Homo}\left(\left\{g_R\left(h_w^{(i)}\right)\right\| \in \mathcal{N}_R(v)\right\}\right)|\forall R = \right.\right.$$

$$(T, \phi(v)) \in \mathcal{R}\}\right)$$

Here, $\mathcal{N}_R$(v)={w$\in \mathcal{V}$(w, v)$\in \mathcal{E}$ and $\psi$(w, v)=R} is the neighborhood of node v under the specific edge type R. Here, $AGG_{Homo}$ employs a mean operator to normalize message contributions within the same type, while $AGG_{Heter}$ uses an attention mechanism to dynamically weight the importance of messages from different types, enhancing the model's ability to prioritize relevant incoming messages. Thus, messages from immediate neighbors are aggregated in a graph G.

In some aspects, the heterogeneous graph may include a set of edges that connect nodes corresponding to a classification target to nodes corresponding to historical (already classified) classification targets. This reduces issues inherent to GNNs such as over-squashing and limited expressiveness, and may be referred to as graph data augmentation. In graph data augmentation, an additional type of edge within transaction nodes, effectively making historical transactions direct neighbors of the target transaction. This adjustment allows the target transaction to aggregate messages from historical transactions in just one message-passing iteration. Specifically, processing system 200 may introduce an extra set of edges $\mathcal{E}_{aug}$ into the original graph $\mathcal{E} \cup \mathcal{E}_{aug}$ according to Equation 4:

$$\mathcal{E}_{aug} = \{(v_1, v_2) \in \mathcal{V} \times \mathcal{V} |_{v_1, v_2 \in T_{transaction}},$$
$$\exists v_c \in T_{company}, p_c \in \mathcal{K}_{v_1} \cap \mathcal{K}_{v_2}\}.$$

The edge set $\mathcal{E}_{aug}$ is the set of transaction pairs if they are from the same user (e.g., company, business, organization), such as if the transaction pairs are related to the same value or table. Furthermore, messages associated with these edges may be aggregated using a weighted message aggregator (such as GATv2). Thus, over-squashing is addressed. For example, GNNs learn the node representation iteratively from the local neighborhood. However, due to this recurrent learning paradigm, GNNs often face a challenge where the information from a growing receptive field is compressed into a fixed-length vector, potentially losing valuable information. This phenomenon may occur in the transaction graph G. By rewiring the graph and applying a weighted message aggregator like GATv2, it can effectively enable the target transaction's incoming message to keep the most relevant information, enhancing the effectiveness of the prediction. Furthermore, expressiveness of the graph is enhanced. For example, by directly connecting two-hop neighbors (historical transactions) as immediate neighbors to the target transaction in graph G, the processing system 200 approximates a K-hop GNN approach. This augmentation not only improves expressiveness but does so without significantly increasing computational costs, thus maintaining a balance between accuracy and efficiency.

Further description of link prediction is now provided. Link prediction, in this context, may represent a ranking problem where the GNN is expected to rank the correct node pair (the ground truth link) higher than other node pairs (non-connected links). Specifically, for a classification target node $v_i$ and its corresponding category node $v_j$ in graph G, the score of ($v_i$, $v_j$) should be higher than that of any other category node pair ($v_i$, $v_k$), where $v_k$ represents any category node not connected to $v_i$.

The GNN may use any suitable scoring function between classification target nodes and category nodes. In some examples, the GNN may use an inner product as the scoring function, and may use an area under the curve as a training objective, according to Equation 5:

$$\mathcal{L} = \sum_{(v_i, v_j) \in \mathcal{E}^+, (v_i, v_k) \in \mathcal{E}^-} (1 - (h_i * h_j) + (h_i * h_k))^2$$

Here, $h_v$ denotes the final representation of either a classification target node or a category node. In Equation 5, the set of positive node pairs $\mathcal{E}^+$ is chosen as $\mathcal{E}^+ \subseteq \{(v_i, v_j) \in T_{transaction} \times T_{level3} | p_{v_j} \in \mathcal{K}_{v_i}\}$.

In some aspects, the GNN uses a weighted negative sampling technique. The weighted negative sampling technique is employed to address the imbalanced distribution of categories during the training of the GNN. In this technique, negative samples—pairs of classification target nodes and category nodes that do not have a direct link—are selected based on a weighted probability distribution rather than uniformly. The weights are assigned according to the normalized frequency of category appearances, ensuring that more frequently occurring categories are sampled more often as negatives. This approach helps the model learn more effectively by providing a more representative set of negative examples, which closely mirrors the real-world distribution of categories. By doing so, the weighted negative sampling technique enhances the GNN's ability to distinguish between relevant and irrelevant categories, improving the overall accuracy and robustness of the link prediction task.

For example, the set of negative node pairs, $\mathcal{E}^-$, includes non-connected links, defined according to Equation 6:

$$\mathcal{E}^- \subseteq \{(v_i, v_k) \in T_{target} \times T_{category} | p_{v_j} \notin \mathcal{K}_{v_i}\}.$$

The negative sampling strategy mitigates the impracticality of enumerating all potential negative pairs. For a classification target node $v_i$ and its corresponding positive category node $v_j$, simple uniform sampling from $T_{category} \backslash \{v_j\}$ would be suboptimal due to the long-tail distribution of category nodes. This could prevent effective learning if those category nodes $v_k$, which rarely appear as positives, are sampled as negatives. A weighted multinomial distribution for negative sampling addresses this issue, where weights are assigned according to the normalized frequency of category appearances, enhancing the relevance and challenge of the sampled negatives.

At 222, the processing system 200 outputs indications of one or more assigned categories. For example, the processing system 200 may update the graph and/or the relational database, as described above. As another example, the processing system 200 may provide the indications via a user interface, such as for user approval.

In some aspects, the processing system 200 suggest a category name where such a name has not previously been defined. For example, the processing system 200 may be configured with a list of candidate categories. The processing system 200 (either at the stage of determining similarity scores or at the stage of link prediction) may identify that a candidate category of the list of candidate categories is suitable for a given classification target. For example, the candidate category may be associated with a similarity score that satisfies a threshold. As another example, the candidate category may have a predicted link with the classification target. The processing system 200, as part of outputting the indication of the categories, may output an indication of the candidate category for the classification target.

FIG. 3 illustrates an example process 300 for generating embeddings 208 from input information 204 using a tokenizer 302 and a first model 304. The first model 304 is an example of first model 206, and may include a text encoder. The process 300 begins with input information 204, which includes classification targets and categories. This input information 204 is fed into the tokenizer 302. The tokenizer 302 processes the input information 204 and produces tokenized classification targets and tokenized categories 310. These tokenized outputs are then provided to the first model 304, which may include a transformer-based model. The first model 304 processes the tokenized data to generate embeddings 208, which capture the semantic meaning of the input information.

As shown at 306, the tokenizer 302 may be trained. The training may use a corpus of transaction descriptions, which includes various abbreviations, concatenated terms, and domain-specific jargon commonly found in financial transactions. This corpus serves as the training data for the tokenizer 302. A suitable tokenization method (such as WordPiece) is employed, which iteratively splits words into subword units based on their frequency in the corpus. This method provides for the most common subwords to be represented as individual tokens, while less frequent subwords are broken down into smaller units. By doing so, the tokenizer can effectively handle the diverse and often truncated nature of transaction descriptions, capturing the relevant information without losing context.

Once the vocabulary is established, the tokenizer is trained to convert transaction descriptions into sequences of tokens that the first model 304 can process. During training, the tokenizer 302 learns to recognize and appropriately segment the various terms and abbreviations in the transaction data. This involves configuring (e.g., optimizing) the tokenizer 302 to reduce (e.g., minimize) the number of tokens to represent each description while preserving the semantic meaning. The resulting tokenizer 302 is capable of efficiently processing transaction descriptions, producing tokenized outputs that are both compact and informative. This tokenizer 302 enhances the performance of the first model 304 by providing the first model 304 with well-structured and meaningful input, ultimately leading to more accurate and efficient generation of embeddings for transaction categorization.

As shown at 308, the first model 304 is trained. The process begins with pretraining the first model 304 on a corpus of tokens (e.g., token sequences) derived from the input information 204. During pretraining, the first model 304 learns to predict masked tokens within the token sequences, a task that encourages it to develop a deep understanding of the context and meaning of each token. This phase helps the first model 304 understand the linguistic patterns found in transaction data. After pretraining, the first model 304 undergoes fine-tuning on a labeled dataset where each classification target (e.g., transaction) is associated with a specific category. This fine-tuning process involves training the first model 304 to generate embeddings 208 that accurately reflect the semantic similarity between classification targets and their corresponding categories. The first model 304 is optimized using a contrastive learning approach, where it learns to maximize the similarity between embeddings 208 of classification targets and their correct categories while minimizing the similarity with incorrect categories. This is achieved by using a symmetric cross-entropy loss function, which leverages both positive and negative pairs within each training batch. The fine-tuning process ensures that the first model 304 can generate embeddings 208 that capture the relevant features of transaction data, enabling accurate and efficient categorization when used in conjunction with the GNN for further classification tasks.

For example, each transaction may be formatted by combining one or more of its fields into a single sentence. These fields may include, for example, <description>, <amount>, and <memo>. A <polarity> field also may be included, which indicates a transaction direction of the transaction (e.g., labels the transaction as "received" if the amount is positive or "paid" if it's negative). The complete transaction text may be represented in a sentence as follows: "Transaction <polarity> $<amount> for: <description> <memo>." The categorization labels may be included as structured in the input information 204. The first model 304 refines the representation of each token iteratively through transformer blocks of the first model 304. After processing through these layers, a mean pooling strategy is used to determine a single representation for the whole sentence.

The training objective may be configured (e.g., optimized) for high cosine similarity between matched transaction-category pairs and low similarity for unmatched pairs.

For example, a symmetric cross-entropy loss may be used. More specifically, given a batch of N transaction-category pairs $\{(T_i, L_i)|1 \leq i \leq N\}$, and a text encoder $f(\bullet)$, the training loss is:

$$\mathcal{L} = -\frac{1}{N}\sum_{i=1}^{N}\log\left(\frac{e^{Sim(f(T_i),f(L_i))}}{\sum_{j=1}^{N}e^{Sim(f(T_i),f(L_j))}}\right) + \log\left(\frac{e^{Sim(f(T_i),f(L_i))}}{\sum_{j=1}^{N}e^{Sim(f(T_j),f(L_i))}}\right)$$

where $$Sim(v, w) = \frac{v \cdot w}{|v| \cdot |w|}$$

represents the cosine similarity. This method leverages all non-matching pairs within a batch for contrastive learning, thus eliminating the need for explicit negative sampling.

Figure 4:
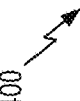
FIG. 4 illustrates an example relational database of input information and historical information.

FIG. 4 illustrates an example 400 of a relational database schema used for a relational database, such as a relational database comprising input information 204. In example 400, classification targets are transactions. The relational database organizes transaction data into interconnected tables. Each table represents different entities and their attributes. The table 402, labeled "Category," contains columns for Category ID, Category Name, and Level 2 ID, which links each category to a higher- or lower-level category in the Level 2 table 408. The Level 2 table 408 includes columns for Level 2 ID, Level 2 Name, and Level 1 ID, establishing a hierarchical relationship with the Level 1 table 410. The Level 1 table 410, in turn, contains Level 1 ID and Level 1 Name.

The transaction table 404 includes columns for Transaction ID, Company ID, Description, Amount (e.g., transaction amount), Memo (e.g., a memorandum text string), and Categorization. This transaction table 404 records individual transactions and links them to specific companies and categories. The Company ID column in the transaction table 404 references the Company table 406, which includes Company ID, Company Name, Industry Name, and Business Type. This relationship, illustrated by link 414, allows the database to associate each transaction with the corresponding company and its details.

Link 412 connects the category table 402 to the transaction table 404, allowing transactions to be categorized accurately. Similarly, link 416 connects the Level 2 table 408 to the Category table 402, and link 418 connects the Level 1 table 410 to the Level 2 table 408, establishing a hierarchical structure for categories. These links ensure that each transaction can be traced back through multiple levels of categorization, providing a comprehensive view of the data. The links 412, 414, 416, 418 may be defined by foreign/primary key pairs within the tables 402, 404, 406, 408, 410. The tables 402, 404, 406, 408, 410 may be referred to herein as data structures.

FIG. 5 is a diagram illustrating an example 500 of generation of a graph 505 based on a relational database 510. The relational database 510 is a simplified example of the relational database of example 400. The relational database 510 includes a category table 515 (e.g., category table 402), a transaction table 520 (e.g., transaction table 404) indicating classification targets, and a company table 525. Two instances of the transaction table 520 are illustrated at 520a and 520b, representing two rows (e.g., classification targets) of the transaction table 520. Transaction table 520a indicates a historical classification target that has already been classified, and transaction table 520b indicates a new classification target (as indicated at 530). Each table 515, 520, 525 is associated with a respective node type for conversion to a heterogeneous graph, as illustrated by the shapes and node types above each table.

The historical classification target of transaction table 520a is linked at 540a to a category name of ACH and a category ID of 10 in the category table 515, meaning that the historical classification target has been classified as an ACH transaction. The historical classification target of transaction table 520a is also linked at 535a to a company name of ABC Inc. in the company table 525. Thus, in the graph 505, there are edges 535b and 540b between the historical classification target node, the category node, and the company node. Furthermore, according to aspects described herein, a processing system 200 may generate a link 550 between a node corresponding to the new classification target and a node corresponding to the historical classification target.

According to the operations of FIG. 2, a processing system 200 may classify the new classification target of transaction table 520b. For example, the processing system 200 performs link prediction using a GNN to predict a link 555 between the new classification target node and the category node. Additionally, or alternatively, if a similarity score between the new classification target and the category satisfies a threshold, the processing system 200 may classify the new classification target according to the similarity score without performing link prediction.

Example Methods

Figure 9:
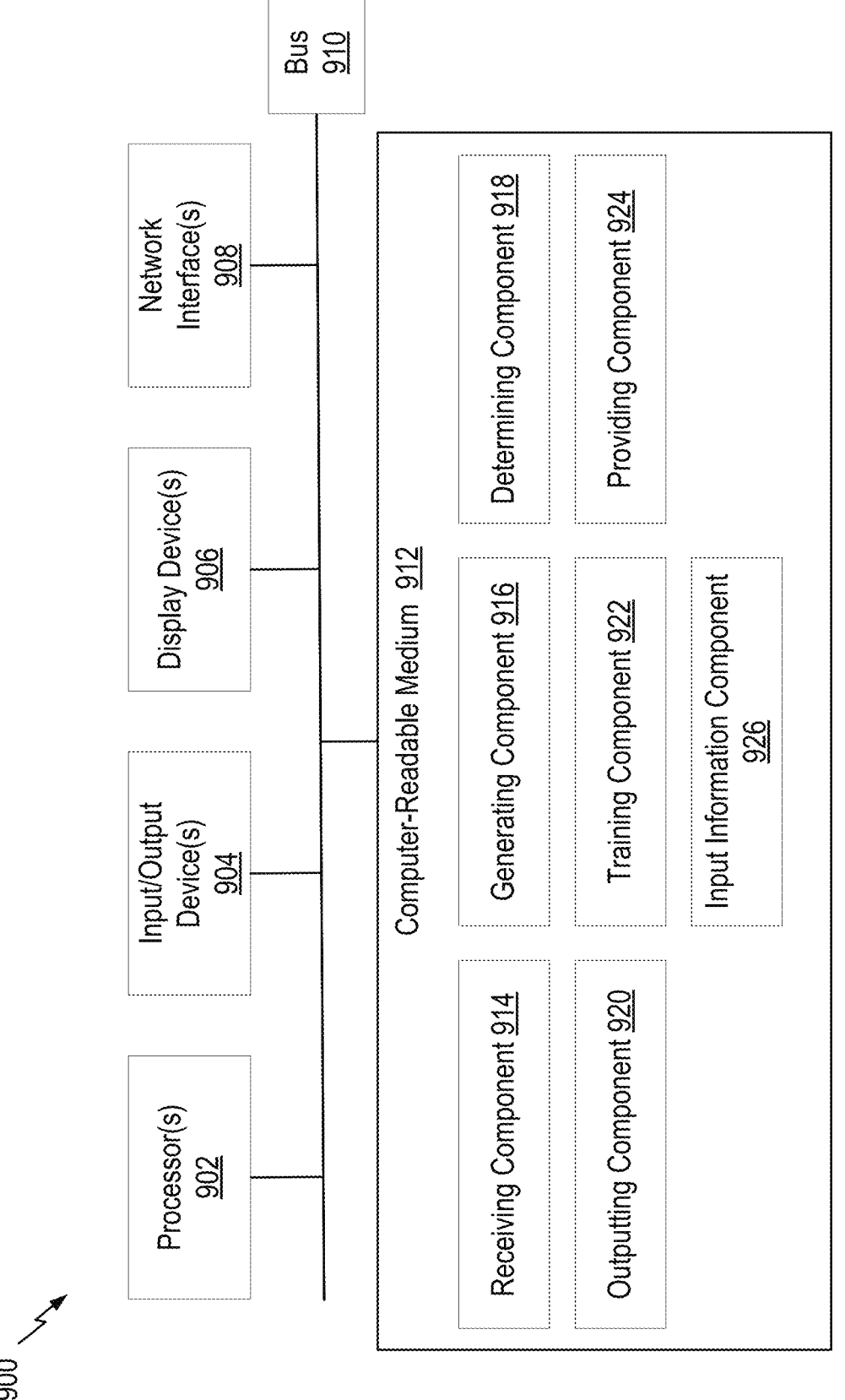
FIG. 9 depicts an example processing system with which aspects of the present disclosure can be performed.

FIG. 6 shows a method 600 for categorization by a processing system, such as a processing system of host 102 or microservice 104, a processing system 200, or a processing system 900 of FIG. 9.

Method 600 begins at block 605 with receiving input information regarding a plurality of classification targets and a plurality of categories for classification of the plurality of classification targets.

Method 600 then proceeds to block 610 with generating a plurality of embeddings for the input information using a first model, the plurality of embeddings including: a set of first embeddings associated with the plurality of classification targets, and a set of second embeddings associated with the plurality of categories.

Method 600 then proceeds to block 615 with determining that a similarity score for the set of first embeddings and the set of second embeddings fails to satisfy a threshold.

Method 600 then proceeds to block 620 with generating, based on the similarity score failing to satisfy the threshold and using a GNN, a classification of the plurality of classification targets in accordance with the plurality of categories.

Method 600 then proceeds to block 625 with outputting information regarding the classification.

In some aspects, the input information further includes data associated with the plurality of classification targets, the data comprising at least one of a timestamp, a transaction amount, or a transaction type.

In some aspects, the GNN is configured to use a heterogeneous graph structure that includes a plurality of nodes representing users, transactions, and categories, and a plurality of edges representing relationships between the plurality of nodes.

In some aspects, each node of the plurality of nodes is one of a plurality of node types, wherein each node type of the plurality of node types is associated with a respective data structure of a plurality of data structures of a relational database.

In some aspects, a first data structure of the plurality of data structures is associated with a first parameter of the input information and a second data structure of the plurality of data structures is associated with a second parameter of the input information.

In some aspects, method 600 further includes generating the heterogeneous graph structure.

In some aspects, block 620 includes performing a link prediction using the heterogeneous graph structure.

In some aspects, generating the classification is based on the similarity score.

In some aspects, the information regarding the classification includes a confidence score indicating a likelihood that the classification is correct.

In some aspects, the GNN is based on a weighted negative sampling technique.

In some aspects, the set of first embeddings is based on data of the plurality of classification targets without historical information regarding a company associated with the plurality of classification targets.

In some aspects, method 600, or any aspect related to it, may be performed by an apparatus or processing system, such as processing system 900 of FIG. 9, which includes various components operable, configured, or adapted to perform the method 600. Processing system 900 is described below in further detail.

Note that FIG. 6 is just one example of a method, and other methods including fewer, additional, or alternative operations are possible consistent with this disclosure.

FIG. 7 shows a method 700 for categorization by a processing system, such as a processing system of host 102 or microservice 104, a processing system 200, or a processing system 900 of FIG. 9.

Method 700 begins at block 705 with receiving input information regarding a plurality of classification targets and a plurality of categories for classification of the plurality of classification targets.

Method 700 then proceeds to block 710 with training a first model to generate a plurality of embeddings for the input information, the plurality of embeddings including: a set of first embeddings associated with the plurality of classification targets, and a set of second embeddings associated with the plurality of categories.

Method 700 then proceeds to block 715 with generating a heterogeneous graph structure for a GNN, the heterogeneous graph structure including: a plurality of nodes representing users, transactions, and categories of the input information, and a plurality of edges representing relationships between the plurality of nodes.

Method 700 then proceeds to block 720 with providing the first model and the GNN.

In some aspects, each node of the plurality of nodes is one of a plurality of node types, wherein each node type of the plurality of node types is associated with a respective data structure of a plurality of data structures of a relational database.

In some aspects, a first data structure of the plurality of data structures is associated with a first parameter of the input information and a second data structure of the plurality of data structures is associated with a second parameter of the input information.

In some aspects, the GNN uses a message-passing mechanism based on historical information being treated as edges between nodes representing transactions.

In some aspects, the first model is a transformer-based language model.

In some aspects, block 710 includes training the first model based on a tokenizer that is specialized for transaction data.

In some aspects, method 700, or any aspect related to it, may be performed by an apparatus, such as processing system 900 of FIG. 9, which includes various components operable, configured, or adapted to perform the method 700. Processing system 900 is described below in further detail.

Note that FIG. 7 is just one example of a method, and other methods including fewer, additional, or alternative operations are possible consistent with this disclosure.

FIG. 8 shows a method 800 for wireless communications by an apparatus, such as a host 102 or microservice 104, a processing system 200, or a processing system 900 of FIG. 9.

Method 800 begins at block 805 with receiving input information regarding a plurality of classification targets and a plurality of categories for classification of the plurality of classification targets.

Method 800 then proceeds to block 810 with generating a plurality of embeddings for the input information using a first model, the plurality of embeddings including: a set of first embeddings associated with the plurality of classification targets, and a set of second embeddings associated with the plurality of categories.

Method 800 then proceeds to block 815 with generating, based on a similarity score for the set of first embeddings and the set of second embeddings failing to satisfy a threshold and using a GNN, a classification of the plurality of classification targets in accordance with the plurality of categories.

Method 800 then proceeds to block 820 with outputting information regarding the classification.

In some aspects, the information regarding the classification indicates a suggested category, not included in the plurality of categories, for a classification target of the plurality of classification targets.

In some aspects, the suggested category is based on historical information of the input information.

In some aspects, the information regarding the classification includes a confidence score indicating a likelihood that the classification is correct.

In some aspects, method 800, or any aspect related to it, may be performed by an apparatus, such as processing system 900 of FIG. 9, which includes various components operable, configured, or adapted to perform the method 800. Processing system 900 is described below in further detail.

Note that FIG. 8 is just one example of a method, and other methods including fewer, additional, or alternative operations are possible consistent with this disclosure.

Example Processing System for Categorization by a Device

FIG. 9 depicts an example processing system 900 configured to perform various aspects described herein, including, for example, method 600 as described above with respect to FIG. 6, method 700 as described above with respect to FIG. 7, and/or method 800 as described above with respect to FIG. 8.

Processing system 900 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 900 includes one or more processors 902, one or more input/output devices 904, one or more display devices 906, one or more network interfaces 908 through which processing system 900 is connected to one or more networks (e.g., a local network, an intranet, the Internet, or any other group of processing systems communicatively connected to each other), and computer-readable medium 912. In the depicted example, the aforementioned components are coupled by a bus 910, which may generally be configured for data exchange amongst the components. Bus 910 may be representative of multiple buses, while only one is depicted for simplicity.

Processor(s) 902 are generally configured to retrieve and execute instructions stored in one or more memories, including local memories like computer-readable medium 912, as well as remote memories and data stores. Similarly, processor(s) 902 are configured to store application data residing in local memories like the computer-readable medium 912, as well as remote memories and data stores. More generally, bus 910 is configured to transmit programming instructions and application data among the processor(s) 902, display device(s) 906, network interface(s) 908, and/or computer-readable medium 912. In certain embodiments, processor(s) 902 are representative of a one or more central processing units (CPUs), graphics processing unit (GPUs), tensor processing unit (TPUs), accelerators, and other processing devices.

Input/output device(s) 904 may include any device, mechanism, system, interactive display, and/or various other hardware and software components for communicating information between processing system 900 and a user of processing system 900. For example, input/output device(s) 904 may include input hardware, such as a keyboard, touch screen, button, microphone, speaker, and/or other device for receiving inputs from the user and sending outputs to the user.

Display device(s) 906 may generally include any sort of device configured to display data, information, graphics, user interface elements, and the like to a user. For example, display device(s) 906 may include internal and external displays such as an internal display of a tablet computer or an external display for a server computer or a projector. Display device(s) 906 may further include displays for devices, such as augmented, virtual, and/or extended reality devices. In various embodiments, display device(s) 916 may be configured to display a graphical user interface.

Network interface(s) 908 provide processing system 900 with access to external networks and thereby to external processing systems. Network interface(s) 908 can generally be any hardware and/or software capable of transmitting and/or receiving data via a wired or wireless network connection. Accordingly, network interface(s) 908 can include a communication transceiver for sending and/or receiving any wired and/or wireless communication.

Computer-readable medium 912 may be a volatile memory, such as a random access memory (RAM), or a nonvolatile memory, such as nonvolatile random access memory (NVRAM), or the like. In this example, computer-readable medium 912 includes receiving component 914, generating component 916, determining component 918, outputting component 920, training component 922, providing component 924, and input information component 926. Processing of the components 914-926 may enable and cause the processing system 900 to perform: the method 600 as described above with respect to FIG. 6, or any aspect related to it; the method 700 as described above with respect to FIG. 7, or any aspect related to it; and/or method 800 as described above with respect to FIG. 8, or any aspect related to it.

In certain embodiments, receiving component 914 is configured to receive input information regarding a plurality of classification targets and a plurality of categories for classification of the plurality of classification targets, as described in FIG. 6 with reference to block 605. In certain embodiments, generating component 916 is configured to generate a plurality of embeddings for the input information using a first model, the plurality of embeddings including: a set of first embeddings associated with the plurality of classification targets, and a set of second embeddings associated with the plurality of categories, as described in FIG. 6 with reference to block 610. In certain embodiments, determining component 918 is configured to determine that a similarity score for the set of first embeddings and the set of second embeddings fails to satisfy a threshold, as described in FIG. 6 with reference to block 615. In certain embodiments, generating component 916 is configured to generate a classification of the plurality of classification targets in accordance with the plurality of categories based on the similarity score failing to satisfy the threshold and using a GNN, as described in FIG. 6 with reference to block 620. In certain embodiments, outputting component 920 is configured to output information regarding the classification, as described in FIG. 6 with reference to block 625.

In certain embodiments, receiving component 914 is configured to receive input information regarding a plurality of classification targets and a plurality of categories for classification of the plurality of classification targets, as described in FIG. 7 with reference to block 705. In certain embodiments, training component 922 is configured to train a first model to generate a plurality of embeddings for the input information, the plurality of embeddings including: a set of first embeddings associated with the plurality of classification targets, and a set of second embeddings associated with the plurality of categories, as described in FIG. 7 with reference to block 710. In certain embodiments, generating component 916 is configured to generate a heterogeneous graph structure for a graph neural network (GNN), the heterogeneous graph structure including: a plurality of nodes representing users, transactions, and categories of the input information, and a plurality of edges representing relationships between the plurality of nodes, as described in FIG. 7 with reference to block 715. In certain embodiments, providing component 924 is configured to provide the first model and the GNN, as described in FIG. 7 with reference to block 720.

In certain embodiments, receiving component 914 is configured to receive input information regarding a plurality of classification targets and a plurality of categories for classification of the plurality of classification targets, as described in FIG. 8 with reference to block 805. In certain embodiments, generating component 916 is configured to generate a plurality of embeddings for the input information using a first model, the plurality of embeddings including: a set of first embeddings associated with the plurality of classification targets, and a set of second embeddings associated with the plurality of categories, as described in FIG. 8 with reference to block 810. In certain embodiments, generating component 916 is configured to generate, based on a similarity score for the set of first embeddings and the set of second embeddings failing to satisfy a threshold and using a GNN, a classification of the plurality of classification targets in accordance with the plurality of categories, as described in FIG. 8 with reference to block 815. In certain embodiments, outputting component 920 is configured to output information regarding the classification, as described in FIG. 8 with reference to block 820. In certain embodiments, input information component 926 is configured to store or provide the input information.

Note that FIG. 9 is just one example of a processing system consistent with aspects described herein, and other processing systems having additional, alternative, or fewer components are possible consistent with this disclosure.

Example Clauses

Implementation examples are described in the following numbered clauses:

Clause 1: A method of categorization by a device, comprising: receiving input information regarding a plurality of classification targets and a plurality of categories for classification of the plurality of classification targets; generating a plurality of embeddings for the input information using a first model, the plurality of embeddings including: a set of first embeddings associated with the plurality of classification targets, and a set of second embeddings associated with the plurality of categories; determining that a similarity score for the set of first embeddings and the set of second embeddings fails to satisfy a threshold; generating, based on the similarity score failing to satisfy the threshold and using a GNN, a classification of the plurality of classification targets in accordance with the plurality of categories; and outputting information regarding the classification.

Clause 2: The method of Clause 1, wherein the input information further includes data associated with the plurality of classification targets, the data comprising at least one of a timestamp, a transaction amount, or a transaction type.

Clause 3: The method of any one of Clauses 1-2, wherein the GNN is configured to use a heterogeneous graph structure that includes a plurality of nodes representing users, transactions, and categories, and a plurality of edges representing relationships between the plurality of nodes.

Clause 4: The method of Clause 3, wherein each node of the plurality of nodes is one of a plurality of node types, wherein each node type of the plurality of node types is associated with a respective data structure of a plurality of data structures of a relational database.

Clause 5: The method of Clause 4, wherein a first data structure of the plurality of data structures is associated with a first parameter of the input information and a second data structure of the plurality of data structures is associated with a second parameter of the input information.

Clause 6: The method of Clause 3, further comprising: generating the heterogeneous graph structure.

Clause 7: The method of Clause 3, wherein generating the classification further comprises performing a link prediction using the heterogeneous graph structure.

Clause 8: The method of any one of Clauses 1-7, wherein generating the classification is based on the similarity score.

Clause 9: The method of any one of Clauses 1-8, wherein the information regarding the classification includes a confidence score indicating a likelihood that the classification is correct.

Clause 10: The method of any one of Clauses 1-9, wherein the GNN is based on a weighted negative sampling technique.

Clause 11: The method of any one of Clauses 1-10, wherein the set of first embeddings is based on data of the plurality of classification targets without historical information regarding a company associated with the plurality of classification targets.

Clause 12: A method of categorization by a device, comprising: receiving input information regarding a plurality of classification targets and a plurality of categories for classification of the plurality of classification targets; training a first model to generate a plurality of embeddings for the input information, the plurality of embeddings including: a set of first embeddings associated with the plurality of classification targets, and a set of second embeddings associated with the plurality of categories; generating a heterogeneous graph structure for a GNN, the heterogeneous graph structure including: a plurality of nodes representing users, transactions, and categories of the input information, and a plurality of edges representing relationships between the plurality of nodes; and providing the first model and the GNN.

Clause 13: The method of Clause 12, wherein each node of the plurality of nodes is one of a plurality of node types, wherein each node type of the plurality of node types is associated with a respective data structure of a plurality of data structures of a relational database.

Clause 14: The method of Clause 13, wherein a first data structure of the plurality of data structures is associated with a first parameter of the input information and a second data structure of the plurality of data structures is associated with a second parameter of the input information.

Clause 15: The method of any one of Clauses 12-14, wherein the GNN uses a message-passing mechanism based on historical information being treated as edges between nodes representing transactions.

Clause 16: The method of any one of Clauses 12-15, wherein the first model is a transformer-based language model.

Clause 17: The method of any one of Clauses 12-16, wherein training the first model comprises training the first model based on a tokenizer that is specialized for transaction data.

Clause 18: A method for wireless communications by an apparatus comprising: receiving input information regarding a plurality of classification targets and a plurality of categories for classification of the plurality of classification targets; generating a plurality of embeddings for the input information using a first model, the plurality of embeddings including: a set of first embeddings associated with the plurality of classification targets, and a set of second embeddings associated with the plurality of categories; generating, based on a similarity score for the set of first embeddings and the set of second embeddings failing to satisfy a threshold and using a GNN, a classification of the plurality of classification targets in accordance with the plurality of categories; and outputting information regarding the classification.

Clause 19: The method of Clause 18, wherein the information regarding the classification indicates a suggested category, not included in the plurality of categories, for a classification target of the plurality of classification targets.

Clause 20: The method of Clause 19, wherein the suggested category is based on historical information of the input information.

Clause 21: The method of any one of Clauses 18-20, wherein the information regarding the classification includes a confidence score indicating a likelihood that the classification is correct.

Clause 22: A processing system, comprising: a memory comprising computer-executable instructions; and a processor configured to execute the computer-executable instructions and cause the processing system to perform a method in accordance with any one of Clauses 1-21.

Clause 23: A processing system, comprising means for performing a method in accordance with any one of Clauses 1-21.

Clause 24: A non-transitory computer-readable medium storing program code for causing a processing system to perform the steps of any one of Clauses 1-21.

Clause 25: A computer program product embodied on a computer-readable storage medium comprising code for performing a method in accordance with any one of Clauses 1-21.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A method of categorization by a processing system, comprising:
  receiving input information regarding a plurality of classification targets and a plurality of categories for classification of the plurality of classification targets;
  generating a plurality of embeddings for the input information using a first model, the plurality of embeddings including:
    a set of first embeddings associated with the plurality of classification targets, and
    a set of second embeddings associated with the plurality of categories;
  determining that a similarity score for the set of first embeddings and the set of second embeddings fails to satisfy a threshold;
  generating, based on the similarity score failing to satisfy the threshold and using a graph neural network (GNN), a classification of the plurality of classification targets in accordance with the plurality of categories; and
  outputting information regarding the classification.

2. The method of claim 1, wherein the input information further includes data associated with the plurality of classification targets, the data comprising at least one of a transaction direction, a transaction amount, or a memo.

3. The method of claim 1, wherein the GNN is configured to use a heterogeneous graph structure that includes a plurality of nodes representing users, transactions, and categories, and a plurality of edges representing relationships between the plurality of nodes.

4. The method of claim 3, wherein each node of the plurality of nodes is one of a plurality of node types, wherein each node type of the plurality of node types is associated with a respective data structure of a plurality of data structures of a relational database.

5. The method of claim 4, wherein a first data structure of the plurality of data structures is associated with a first parameter of the input information and a second data structure of the plurality of data structures is associated with a second parameter of the input information.

6. The method of claim 3, further comprising generating the heterogeneous graph structure.

7. The method of claim 6, wherein the heterogeneous graph structure is based on relationships of a relational database.

8. The method of claim 3, wherein generating the classification further comprises performing a link prediction using the heterogeneous graph structure.

9. The method of claim 1, wherein generating the classification is based on the similarity score.

10. The method of claim 1, wherein the GNN is based on a weighted negative sampling technique.

11. The method of claim 1, wherein the set of first embeddings is based on a tokenizer that is specialized for transaction data.

12. A method of categorization by a processing system, comprising:

receiving input information regarding a plurality of classification targets and a plurality of categories for classification of the plurality of classification targets;

training a first model to generate a plurality of embeddings for the input information, the plurality of embeddings including:

a set of first embeddings associated with the plurality of classification targets, and a set of second embeddings associated with the plurality of categories;

generating a heterogeneous graph structure for a graph neural network (GNN), the heterogeneous graph structure including:

a plurality of nodes representing users, transactions, and categories of the input information, and a plurality of edges representing relationships between the plurality of nodes; and providing the first model and the GNN.

13. The method of claim 12, wherein each node of the plurality of nodes is one of a plurality of node types, wherein each node type of the plurality of node types is associated with a respective data structure of a plurality of data structures of a relational database.

14. The method of claim 13, wherein a first data structure of the plurality of data structures is associated with a first parameter of the input information and a second data structure of the plurality of data structures is associated with a second parameter of the input information.

15. The method of claim 12, wherein the GNN uses a message-passing mechanism based on relationships being treated as edges between nodes representing transactions.

16. The method of claim 12, wherein the first model is a transformer-based language model.

17. The method of claim 12, wherein training the first model comprises training the first model based on a tokenizer that is specialized for transaction data.

18. An apparatus, comprising a processing system that includes one or more processors and one or more memories, the processing system configured to cause the apparatus to:

receive input information regarding a plurality of classification targets and a plurality of categories for classification of the plurality of classification targets;

generate a plurality of embeddings for the input information using a first model, the plurality of embeddings including:

a set of first embeddings associated with the plurality of classification targets, and a set of second embeddings associated with the plurality of categories;

generate, based on a similarity score for the set of first embeddings and the set of second embeddings failing to satisfy a threshold and using a graph neural network (GNN), a classification of the plurality of classification targets in accordance with the plurality of categories; and output information regarding the classification.

19. The apparatus of claim 18, wherein the information regarding the classification indicates a suggested category, not included in the plurality of categories, for a classification target of the plurality of classification targets.

20. The apparatus of claim 19, wherein the suggested category is based on historical information of the input information.

* * * * *